(12) United States Patent
Sun

(10) Patent No.: US 9,542,302 B2
(45) Date of Patent: Jan. 10, 2017

(54) SYSTEM AND METHOD FOR REMOTE DEBUGGING OF AN APPLICATION IN AN IMAGE FORMING APPARATUS OVER A NETWORK

(71) Applicant: KYOCERA Document Solutions Inc., Osaka (JP)

(72) Inventor: Changsong Sun, Osaka (JP)

(73) Assignee: KYOCERA Document Solutions Inc. (JP)

( * ) Notice: Subject to any disclaimer, the term of this patent is extended or adjusted under 35 U.S.C. 154(b) by 398 days.

(21) Appl. No.: 14/187,255

(22) Filed: Feb. 22, 2014

(65) Prior Publication Data

US 2014/0245266 A1   Aug. 28, 2014

(30) Foreign Application Priority Data

Feb. 28, 2013   (JP) .................................. 2013-039368

(51) Int. Cl.
  *G06F 9/44*   (2006.01)
  *G06F 11/36*  (2006.01)

(52) U.S. Cl.
  CPC ....... *G06F 11/3664* (2013.01); *G06F 11/3688* (2013.01)

(58) Field of Classification Search
  None
  See application file for complete search history.

(56) References Cited

U.S. PATENT DOCUMENTS

| | | | |
|---|---|---|---|
| 5,589,881 A * | 12/1996 | Dunham et al. | 348/300 |
| 5,815,653 A * | 9/1998 | You et al. | 714/38.13 |
| 5,828,863 A * | 10/1998 | Barrett et al. | 703/24 |
| 6,119,247 A * | 9/2000 | House et al. | 714/38.14 |
| 6,618,854 B1 * | 9/2003 | Mann | 717/124 |
| 7,117,280 B2 * | 10/2006 | Vasudevan | 710/100 |
| 2004/0123271 A1 * | 6/2004 | Bindewald | G06F 11/362 717/124 |
| 2006/0195894 A1 * | 8/2006 | Nita | G06F 11/3664 726/11 |
| 2007/0168997 A1 * | 7/2007 | Tran | G06F 11/3664 717/129 |

FOREIGN PATENT DOCUMENTS

JP   2003-208334 A   7/2003

* cited by examiner

*Primary Examiner* — Adam Lee
(74) *Attorney, Agent, or Firm* — McDonnell Boehnen Hulbert & Berghoff LLP

(57) ABSTRACT

A system includes an intervening server, an information processing apparatus, and an image forming apparatus. The information processing apparatus i) sends debug command information including a debug command and a first identifier to the intervening server, ii) periodically requests for operation log information including an operation log and a second identifier to the intervening server, iii) receives the operation log information, and iv) stores the operation log associated with the debug command, if the first identifier matches with the second identifier. The image forming apparatus i) periodically requests for the debug command information to the intervening server, ii) receives the debug command information, iii) acquires the operation log of an application in response to the debug command, and iv) sends, to the intervening server, the operation log information including the operation log and the second identifier included in the debug command information.

11 Claims, 3 Drawing Sheets

SYSTEM AND METHOD FOR REMOTE DEBUGGING OF AN APPLICATION IN AN IMAGE FORMING APPARATUS OVER A NETWORK

INCORPORATION BY REFERENCE

This application is based upon, and claims priority to corresponding Japanese Patent Application No. 2013-039368, filed in the Japan Patent Office on Feb. 28, 2013, the entire contents of which are incorporated herein by reference.

FIELD

Unless otherwise indicated herein, the description in this field section or the background section is not prior art to the claims in this application and is not admitted to be prior art by inclusion in this section. The present disclosure relates to a system and a method that remotely debug an application in an image forming apparatus via the Internet.

BACKGROUND

An application in an image forming apparatus is tested before it is delivered to a user. Since the image forming apparatus has been provided with more functions, and the configurations of applications have thereby become complex, an application error often occurs under a particular condition due to a bug after the image forming apparatus has been delivered to a user. When the manufacturer of the image forming apparatus attempts to reproduce the particular condition to investigate the cause of the application error, the particular condition may not be able to be reproduced.

SUMMARY

The present disclosure relates to a system and a method with a simple configuration that can easily reproduce a particular condition under which an application error has occurred after an image forming apparatus had been delivered to a user.

To be more specific, the present disclosure relates to a system and a method with a simple configuration that can easily debug an application in an image forming apparatus from a remote site via the Internet even if a firewall is set to be valid.

According to the embodiment of the present disclosure, a system includes an intervening server, an information processing apparatus, and an image forming apparatus.

The intervening server is connected to a network and provides a network communication service. The information processing apparatus is connected to the network and includes a first client capable of using the network communication service provided by the intervening server. The image forming apparatus is connected to the network and includes an application, a debugger capable of performing a debugging operation on the application, and a second client that requests for the network communication service to the intervening server.

The first client i) sends debug command information that includes a debug command and a first identifier to the intervening server, ii) periodically requests for operation log information that includes an operation log and a second identifier to the intervening server, iii) receives the operation log information from the intervening server, and iv) stores the operation log associated with the debug command, if the first identifier matches with the second identifier.

The second client i) periodically requests for the debug command information to the intervening server, ii) receives the debug command information from the intervening server, iii) acquires the operation log that is obtained by operating the application in response to the debug command, and iv) sends, to the intervening server, the operation log information that includes the operation log and the second identifier included in the debug command information.

Additional features and advantages are described herein, and will be apparent from the following Detailed Description and the figures.

BRIEF DESCRIPTION OF THE FIGURES

All drawings are intended to illustrate some aspects and examples of the present disclosure. The drawings described are only schematic and are non-limiting, and are not necessarily drawn to scale.

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

In a system in the present disclosure, if an application error occurs in an image forming apparatus of a user, a serviceman from a distributor checks an application error on the image forming apparatus. The serviceman then reproduces the condition under which the error has occurred on the image forming apparatus in which the application error has occurred or on an image forming apparatus in the distributor. A person at the manufacturer of the image forming apparatus remotely debugs the application in the image forming apparatus over the Internet or the like.

If a firewall is set, access from an external apparatus may be denied, even if port 80 of the HyperText Transfer Protocol (HTTP) is used, for example. As a result, the applications in an image forming apparatus cannot generally be debugged from a remote site.

The system in the present disclosure allows for easy debugging of an application in an image forming apparatus via the Internet or the like, even if a firewall is set to be valid.

Figure 1:
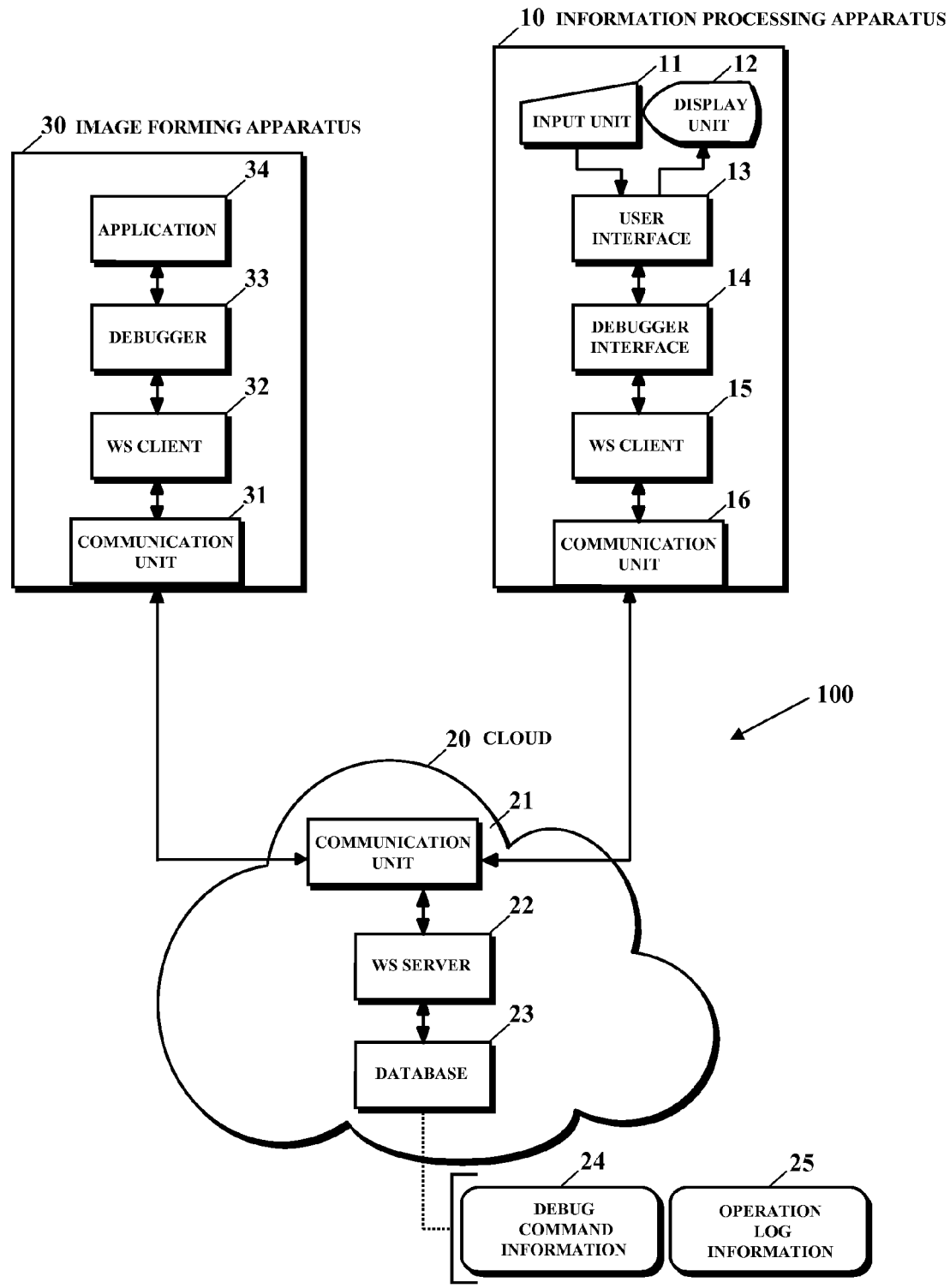
FIG. 1 is a block diagram illustrating the functional configuration of a system in the present disclosure.

FIG. 1 is a block diagram illustrating the functional configuration of the system 100 in the present disclosure.

An information processing apparatus 10 is connected to an image forming apparatus 30 via a cloud network 20 that is an intervening server on the Internet.

The information processing apparatus 10 is, for example, a personal computer at a manufacturer office, service center, or any other location that may be in a remote location away from the image forming apparatus. The information processing apparatus 10 includes an input unit 11 that functions as an input/output device, a display unit 12, a user interface 13 that functions as a control unit, a debugger interface 14, a Web service (WS) client 15, and a communication unit 16 connected to the Internet.

The cloud network 20 includes a communication unit 21 connected to the Internet, a WS server 22 that functions as a control unit, and a database 23 that is used as a back-end database.

The image forming apparatus 30 may be installed at, for example, a distributor of the image forming apparatus manufacturer or a company of the user. The image forming apparatus 30 includes a communication unit 31 connected to the Internet, a WS client 32 that functions as a control unit, a debugger 33 intended for an actual machine, and an application 34. The above-described debugger interface 14 is an interface to the debugger 33.

The control units of the information processing apparatus 10, cloud network 20, and image forming apparatus 30 each include a storage unit that stores programs and data and a processor that executes the programs. The storage unit includes a read-only memory (ROM) in which a bootstrap is stored, an auxiliary storage unit with a large capacity in which an operating system (OS), drivers, applications, and data are stored, a random-access memory (RAM) used as a main storage unit. Programs and data are loaded in the RAM in a virtual storage system at appropriate times, and the programs loaded in the RAM are executed.

The communication units in the information processing apparatus 10, cloud network 20, and image forming apparatus 30 each include a communication interface, a software driver, and a protocol stack of the OS. The protocol stack enables communication of Web service based on, for example, the SOAP protocol. The protocol stack includes layered protocol portions of Simple Object Access Protocol (SOAP), HTTP, Transmission Control Protocol (TCP), and Internet Protocol (IP).

In the information processing apparatus 10, cloud network 20, and image forming apparatus 30, a firewall may be enabled; only a necessary port or ports is open in the information processing apparatus 10, cloud network 20, and image forming apparatus 30. The firewall in the information processing apparatus 10 and image forming apparatus 30 may be configured such that outbound access is permitted but inbound access is denied. The firewall in the cloud network 20 is set so that inbound access is permitted but outbound access is denied.

Encrypted communication based on the Secure Sockets Layer (SSL) protocol may be performed between the information processing apparatus 10 and the cloud network 20 and between the cloud network 20 and the image forming apparatus 30.

Figure 2:
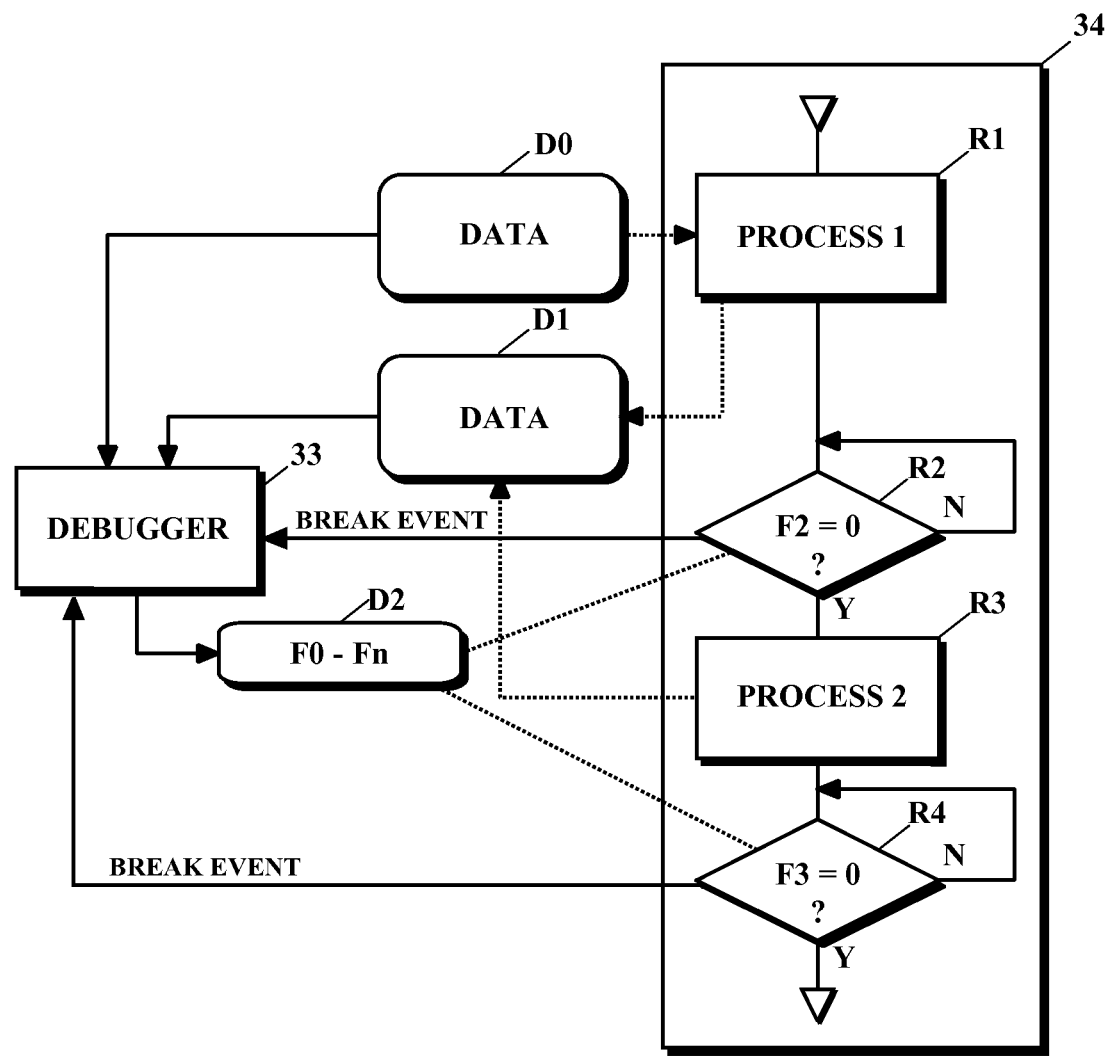
FIG. 2 is a diagram illustrating a relationship between an application and a debugger in an image forming apparatus in the system.

FIG. 2 is a diagram illustrating a relationship between the application 34 and the debugger 33 in the image forming apparatus 30 in the system 100.

In the application 34 in FIG. 2, steps R1 and R3 are usually executed sequentially. The application 34 includes step R2, in which a break is determined, between steps R1 and R3 so that the debugger 33 can acquire data at a certain point during operation of the application 34 before the data is changed in a later operation or process of the application 34, since the later operation or process may result in a change of that data. The application 34 also includes step R4, in which a break is determined, after step R3.

Data D0, data D1, and flag group D2 are stored in the storage unit. The flag group D2 includes (n+1) flags denoted by F0 to Fn. Usually, the (n+1) flags F0 to Fn each have been zero-cleared (reset). If decisions in steps R2 and R4 are affirmative, the process is performed continuously.

If an application error occurs during execution of the application 34, a serviceman from the distributor checks, on the image forming apparatus of the user, the condition under which the error has occurred. On the image forming apparatus 30 of the user or an image forming apparatus in the distributor, the serviceman checks whether the application error occurs again under the condition under which the error has initially occurred. The serviceman checks an operation situation before and near the application error and notifies a person from the image forming apparatus manufacturer. The person from the image forming apparatus manufacturer may be a service representative from the manufacturer, a technician from the manufacturer, or the like.

Next, the person from the image forming apparatus manufacturer predicts the place of the error in the application 34, after which the person activates the information processing apparatus 10, enters a debug command from the input unit 11, and remotely debugs the application 34 in the image forming apparatus 30 via the cloud network 20.

The debug command may include a command to set a flag or flags within the flag group D2. The debugger 33 sets, for example, both flags F2 and F3 to 1. In this state, the operation of the application 34 is enabled by the debugger 33 or serviceman; data D0 is read from the storage unit and is processed in step R1. A result in the above-described process is written to the storage unit as data D1, after which the operation is suspended in step R2 and the debugger 33 is notified of a break event.

In response to this, the debugger 33 reads data D0 and data D1 in accordance with the debug command. The debugger 33 sends, as operation log information 25, information that includes data D0 and data D1 and information indicating that the operation is being suspended in step R2 to the information processing apparatus 10 via the cloud network 20.

The information processing apparatus 10 uses a debugger (not illustrated) that differs from the debugger 33, in an integrated development environment for the source code of the application 34 to set data D0, sets a breakpoint in the source code, and causes the application 34 to execute step R1, after which the information processing apparatus 10 checks that data D1 is obtained. Next, the information processing apparatus 10 sets breakpoints in the source code at short intervals and resumes the operation under the same condition. After suspension at a breakpoint, the information processing apparatus 10 checks changes in variables and data. Then, to find the cause of the error, the information processing apparatus 10 checks changes in variables and data while performing step-by-step operation and the like. The information processing apparatus 10 corrects the error in the source code and generates a patch program for the application 34. The information processing apparatus 10 may then install the patch program in the image forming apparatus 30 via the serviceman locally or via the cloud network 20.

Figure 3:
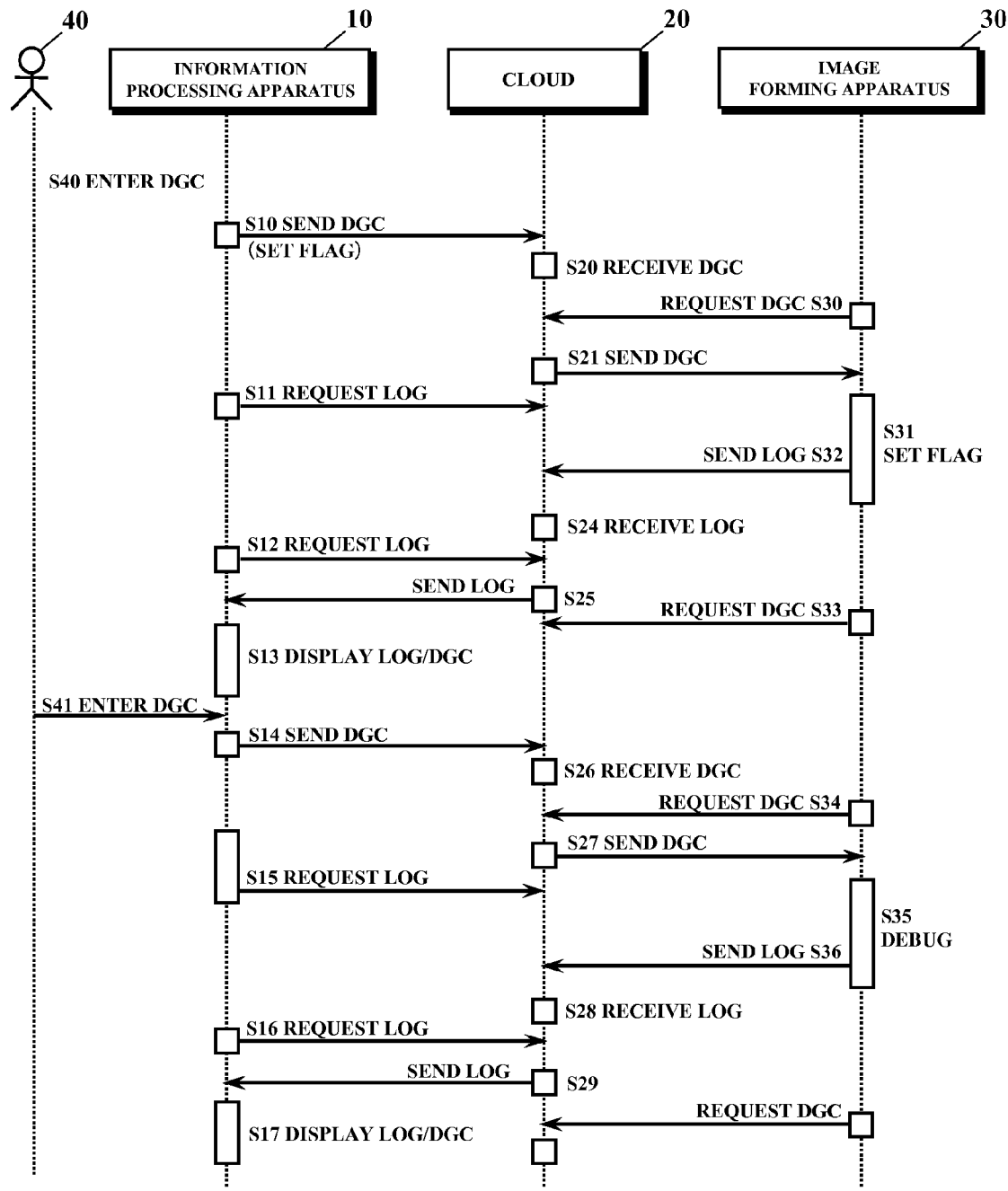
FIG. 3 is a sequence diagram illustrating operations performed among a person operating an information processing apparatus, the information processing apparatus, a cloud network, and the image forming apparatus.

FIG. 3 is a sequence diagram illustrating operations performed among a person 40 operating an information processing apparatus 10, the information processing apparatus 10, the cloud network 20, and the image forming apparatus 30. The operations in FIG. 3 are performed after the information processing apparatus 10 and image forming apparatus 30 are activated and the cloud network 20 has authenticated the information processing apparatus 10, image forming apparatus 30, and person 40 on the information processing apparatus 10 and image forming apparatus 30.

The debugger interface 14 causes the user interface 13 to display a debug command input screen on the display unit 12.

In step S40, the person 40 operates the input unit 11 to enter a debug command (DGC) while making a confirmation on the display unit 12.

When receiving the debug command, the user interface 13 sends the debug command to the debugger interface 14 in step S10. In response to this, the debugger interface 14 generates an identifier, in this case, a universally unique identifier (UUID), and sends the UUID, the debug command, and the IP address as address information of the image forming apparatus 30 to the WS client 15 as debug command information 24. When receiving the debug command information 24, the WS client 15 sends it in the form of a SOAP message that is obtained by performing Extensible Makeup Language (XML) serialization, to the communication unit 21 in the cloud network 20 via the communication unit 16 under the HTTP protocol that is used as the SOAP message transfer protocol.

In step S20, the communication unit 21 receives the SOAP message and sends it to the WS server 22. The WS server 22 performs XML deserialization on the SOAP message to reproduce the original debug command information 24, and stores it in the database 23.

In steps S30, S33, and S34, the image forming apparatus 30 periodically sends a request for the debug command information 24 to the cloud network 20. The request includes the IP address of the image forming apparatus 30.

In step S21, the WS server 22 reads out the debug command information 24 that includes the IP address of the image forming apparatus 30, from the database 23 and sends the debug command information 24 to the communication unit 21, in the form of a SOAP message that is obtained by performing XML serialization. The WS server 22 deletes the debug command information 24 from the database 23. The communication unit 21 sends the debug command information 24 to the communication unit 31 in the image forming apparatus 30 under the HTTP protocol.

In step S31, the communication unit 31 sends the debug command information 24 to the WS client 32, after which the WS client 32 performs XML deserialization on the debug command information 24 and sends the resulting deserialized debug command information 24 to the debugger 33. The debugger 33 performs the above-described operation in accordance with the debug command information 24 and sends, as the operation log information 25 (LOG), a result of the operation to the WS client 32 together with the UUID included in the debug command information 24 and with the IP address of the information processing apparatus 10 in step S32. As with the WS client 15, the WS client 32 sends the operation log information 25 in the form of a SOAP message to the WS server 22 via the communication unit 31 and the communication unit 21 in the cloud network 20.

In step S24, the WS server 22 performs XML deserialization on the operation log information 25 and stores the resulting deserialized information in the database 23.

In steps S12, S15, and S16, the information processing apparatus 10 periodically sends a request for the operation log information 25 to the cloud network 20. The request includes the IP address of the information processing apparatus 10.

In step S25, the WS server 22 reads out the operation log information 25 that includes the IP address as the address information of the information processing apparatus 10, from the database 23 and sends the operation log information 25 to the communication unit 21, in the form of a SOAP message that is obtained by performing XML serialization. The WS server 22 deletes the operation log information 25 from the database 23. The communication unit 21 sends the operation log information 25 to the communication unit 16 in the information processing apparatus 10 under the HTTP protocol.

In step S13, the communication unit 16 sends the operation log information 25 to the WS client 15. The WS client 15 performs XML deserialization on the operation log information 25 and sends the resulting deserialized operation log information 25 to the debugger interface 14. The debugger interface 14 causes the user interface 13 to display the operation log information 25 on the display unit 12 in correspondence to the debug command information 24 including the same UUID as in the operation log information 25. The debugger interface 14 stores the operation log information 25 in the storage unit in the information processing apparatus 10 to use the operation log information 25 in debugging in which the source code is used.

After that, process in steps S41 to S17 is repeated as necessary.

According to this embodiment, the debug command and the operation log are associated with the UUID that is a unique ID included in the debug command information 24 and operation log information 25. The debug command information 24 and operation log information 25 each include the IP address of the transmission destination. In this configuration, the debug command information 24 is sent from the information processing apparatus 10 to the cloud network 20 as an intervening server, and the operation log information 25 is sent from the image forming apparatus 30 to the cloud network 20. Accordingly, even if a firewall is enabled, when an outbound request is sent from the information processing apparatus 10 and image forming apparatus 30, it is possible to remotely debug the application 34 in the image forming apparatus 30 from the information processing apparatus 10 via the cloud network 20.

Furthermore, even if an ordinary firewall enabled in the information processing apparatus 10, cloud network 20, and image forming apparatus 30, remote debugging is possible, so the cause of error in the application 34 can be found and the application 34 can be corrected at an early stage.

While various aspects and embodiments have been disclosed herein, other aspects and embodiments are possible. Other designs may be used in which the above-described components are each present.

For example, the unique ID of the destination device or a user may be used as the address information instead of the IP address included in the debug command information 24 and operation log information 25. The unique ID may be herein referred to as an "association identifier."

For example, a table that associates the unique ID of the destination device or user with the IP address may be retained in the database 23, and the IP address may be obtained from the unique ID with reference to the table. Note that any other method or combination of methods of associating IP addresses with destination devices may be used without departing from the scope of the claims.

For example, the intervening server is not limited to the cloud network 20; the intervening server may be a server that has functions similar to the functions of the cloud network 20.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A system comprising:
   an intervening server configured to be connected to a network and provide a network communication service;
   an information processing apparatus configured to be connected to the network, wherein the information processing apparatus includes a first client capable of using the network communication service provided by the intervening server; and
   an image forming apparatus configured to be connected to the network, wherein the image forming apparatus includes an application, a debugger capable of performing a debugging operation on the application, and a second client capable of using the network communication service provided by the intervening server;
   wherein the first client is configured to i) send debug command information that includes a first Internet Protocol (IP) address of the image forming apparatus, a debug command and a first universally unique identifier (UUID) to the intervening server, ii) periodically request for operation log information that includes a second IP address of the information processing apparatus, an operation log and a second UUID from the intervening server, iii) receive the operation log information from the intervening server, and iv) if the first UUID matches the second UUID store the operation log associated with the debug command; and
   wherein the second client is configured to i) periodically request for the debug command information from the intervening server, ii) receive the debug command information from the intervening server, iii) acquire the operation log that is obtained by operating the application in response to the debug command, and iv) send, to the intervening server, the operation log information that includes the operation log and the second UUID included in the debug command information; and
   wherein a firewall in the information processing apparatus and a firewall in the image forming apparatus are both set so that outbound access is permitted but inbound access is denied, and a firewall in the intervening server is set so that inbound access is permitted but outbound access is denied.

2. The system according to claim 1, wherein the intervening server i) includes a first table that associates the first UUID with the first IP address and a second table that associates the second UUID with the second IP address, and ii) is configured to acquire the first IP address from the first table and the second IP address from the second table.

3. The system according to claim 1, wherein the intervening server includes a cloud network that performs encrypted communication between the first client and the second client to provide the network communication service.

4. The system according to claim 1,
   wherein the image forming apparatus is installed at a distributor of the image forming apparatus or a user of the image forming apparatus; and
   wherein the information processing apparatus is installed at a manufacturer of the image forming apparatus.

5. A method performed by a debugging system, wherein the debugging system comprises: i) an intervening server configured to be connected to a network and provide a network communication service, ii) an information processing apparatus configured to be connected to the network and request for the network communication service from the intervening server, and iii) an image forming apparatus, including an application and a debugger that supports debugging of the application, configured to be connected to the network and request for the network communication service from the intervening server, wherein the method comprises:
   via the information processing apparatus,
   sending debug command information that includes a first Internet Protocol (IP) address of the image forming apparatus, a debug command and a first universally unique identifier (UUID) to the intervening server,
   periodically requesting for operation log information that includes a second IP address of the information processing apparatus, an operation log and a second UUID from the intervening server, and
   receiving the operation log information from the intervening server, and iv) if the first UUID matches the second UUID store the operation log associated with the debug command; and
   via the image forming apparatus,
   periodically requesting for the debug command information from the intervening server,
   receiving the debug command information from the intervening server,
   acquiring the operation log that is obtained by operating the application in response to the debug command, and
   sending, to the intervening server, the operation log information that includes the operation log and the second UUID included in the debug command information;
   wherein a firewall in the information processing apparatus and a firewall in the image forming apparatus are both set so that outbound access is permitted but inbound access is denied, and a firewall in the intervening server is set so that inbound access is permitted but outbound access is denied.

6. The method according to claim 5, wherein the intervening server i) includes a first table that associates the first UUID with the first IP address and a second table that associates the second UUID with the second IP address, and ii) is configured to acquire the first IP address from the first table and the second IP address from the second table.

7. The method according to claim 5, wherein the intervening server includes a cloud network that performs encrypted communication between the information processing apparatus and the image forming apparatus to provide the network communication service.

8. The method according to claim 5,
   wherein the image forming apparatus is installed at a distributor of the image forming apparatus or a user of the image forming apparatus; and wherein the information processing apparatus is installed at a manufacturer of the image forming apparatus.

9. A non-transitory computer-readable medium having stored thereon instructions, that when executed by a processor, cause performance of a set of functions on an information processing apparatus configured to be connected to a network and request for a network communication service from an intervening server, an image forming apparatus including an application and a debugger that supports debugging of the application configured to be connected to the network and request for the network communication service from the intervening server, and the intervening server configured to be connected to the network and provide the network communication service, wherein the set of functions comprises:

via the information processing apparatus,
sending debug command information that includes a first Internet Protocol (IP) address of the image forming apparatus, a debug command and a first universally unique identifier (UUID) to the intervening server,
periodically requesting operation log information that includes a second IP address of the information processing apparatus, an operation log and a second UUID from the intervening server, and
receiving the operation log information from the intervening server, and if the first UUID matches the second UUID storing the operation log associated with the debug command; and via the image forming apparatus,
periodically requesting the debug command information from the intervening server,
receiving the debug command information from the intervening server,
acquiring the operation log that is obtained by operating the application in response to the debug command, and
sending, to the intervening server, the operation log information that includes the operation log and the second UUID included in the debug command information;
wherein a firewall in the information processing apparatus and a firewall in the image forming apparatus are both set so that outbound access is permitted but inbound access is denied, and a firewall in the intervening server is set so that inbound access is permitted but outbound access is denied.

10. The non-transitory computer-readable medium according to claim 9, wherein the intervening server i) includes a first table that associates the first UUID with the first IP address and a second table that associates the second UUID with the second IP address, and ii) is configured to acquire the first IP address from the first table and the second IP address from the second table.

11. The non-transitory computer-readable medium according to claim 9, wherein the intervening server includes a cloud network that performs encrypted communication between the information processing apparatus and the image forming apparatus to provide the network communication service.

* * * * *